United States Patent [19]

Musil et al.

[11] Patent Number: 4,657,796

[45] Date of Patent: Apr. 14, 1987

[54] COATING LAYER WITH SELF-REPAIRING PROPERTIES FOR PANES EXPOSED TO ATMOSPHERIC AGENTS

[75] Inventors: Ingrid Musil; Gerhard Holzer; Helmer Raedisch, all of Aachen, Fed. Rep. of Germany

[73] Assignee: Saint-Gobain Vitrage, Courbevoie, France

[21] Appl. No.: 805,784

[22] Filed: Dec. 6, 1985

[30] Foreign Application Priority Data

Dec. 6, 1984 [FR] France ................................ 84 18603

[51] Int. Cl.$^4$ ...................... B32B 17/10; B32B 27/40; C03C 17/32
[52] U.S. Cl. ....................................... 428/38; 156/99; 427/164; 427/165; 428/423.3; 428/425.6; 528/60; 528/66
[58] Field of Search ..................... 528/60, 66; 427/164, 427/165; 428/38, 425.6, 423.3

[56] References Cited

U.S. PATENT DOCUMENTS 3,979,548  9/1976  Schafer et al. .................. 428/425.6

FOREIGN PATENT DOCUMENTS 1370480  10/1974  United Kingdom .

Primary Examiner—James C. Cannon
Attorney, Agent, or Firm—Oblon, Fisher, Spivak, McClelland & Maier

[57] ABSTRACT

A polyurethane coating layer, with self-repairing properties, for panes made of glass and/or plastic materials, which are exposed to atmospheric agents. The coating layer according to the invention is formed from a reactive mixture of a trifunctional isocyanate component such as the biurets or isocyanurates of 1,6 hexamethylenediisocyanate, having a content of about 15 to 25% by weight of NCO radicals and a polyalcohol component chosen from the plurifunctional polyester polyalcohols having about a 3 to 12% by weight content of OH radicals.

8 Claims, No Drawings

COATING LAYER WITH SELF-REPAIRING PROPERTIES FOR PANES EXPOSED TO ATMOSPHERIC AGENTS

BACKGROUND OF THE INVENTION

1. Field of the Invention

The invention pertains to a transparent polyurethane coating layer, with self-repairing properties, for panes made of glass and/or plastic materials, with the coating layer according to the invention being prepared from a reactive mixture containing a plurifunctional, and specifically a trifunctional, isocyanate component and a plurifunctional polyalcohol component, possibly a reaction catalyst and other auxiliary substances.

2. Background of the Prior Art

Polyurethane coating layers with self-repairing properties are utilized especially as anti-shattering coatings for silicate glass panes, for example, in automobile windshields. This application, is described, for example, in French patent publications Nos. 2 187 719 and 2 251 608. These layers, which are placed on the surface of the window which faces inward, prevent direct contact with the sharp edges of the glass fragments in case the window breaks. In this configuration, the coating layers are protected against direct atmospheric influences by the layer(s) of glass.

Coatings of this type are also utilized as coating layers for transparent plastic materials. German patent publications Nos. 2 058 504, 2 634 816, 3 201 849 describe such an application. In this case, these polyurethane layers serve to improve the scratch resistance of plastic material. The aforementioned polyurethane coatings in fact have the characteristic of being self-repairing, i.e., superficial deformations in these layers disappear after a certain period of time, with the duration of this disappearance generally depending on the temperature.

Such self-repairing polyurethane coating layers can also find applications as coatings for surfaces of panes made of glass and/or plastic materials, which are exposed to the external atmosphere, either to improve the resistance of the plastic materials to scratching, or to improve the resistance of glass to abrasion. It is in fact known that these soft coating layers are also highly suitable to significantly improve the resistance of glass to abrasion, for example, during periods in which they are exposed to contact with sand.

Known polyurethane coating layers have remarkable properties, not only in the area of scratch resistance and other usage properties, but also, especially, in the area of the long-term durability of these properties, as long as these layers are not exposed simultaneously to the influence of light, heat and humidity, i.e., as long as they are not directly exposed to the open atmosphere, namely, direct sunlight and simultaneous exposure to humidity and rain. It was found that, during such exposure to the elements, apparently, due to the effects of light and the simultaneous hydrolytic attack by water, the surface of the coating layers becomes damaged over time. After a certain period of time, this surface deterioration is visible to the naked eye and continues uninterrupted. Consequently, coating layers of known formulas are not appropriate in the long term for use on the external surface of a pane, i.e. which is directly exposed to the outside atmosphere and a continued need for the same is presented.

SUMMARY OF THE INVENTION

The invention proposes a new transparent self-repairing polyurethane coating of the above described type, which, in addition to the good physical and mechanical properties, notably scratch and abrasion resistance, presents an increased resistance to the effects of the elements, specifically against the simultaneous action of light and moisture.

The coating according to the invention is made from a reactive mixture having, as an isocyanate component, essentially trifunctional aliphatic polymers with a 1,6 hexamethylenediisocyanate monomer base, as its biurets or its isocyanates, having an NCO radical content of 15 to 25% by weight and, as a polyalcohol component, plurifunctional polyester polyalcohols, having an OH radical content of 3 to 12% by weight.

Through the use of an isocyanate component and a polyalcohol component which have well-defined chemical compositions, one obtains polyurethane coating layers also of definite chemical structures, which, in addition to the physical-mechanical properties necessary for scratch resistance and those required for implementation and use, also present the desired resistance to the elements. They are consequently suitable for use on external surfaces which are directly exposed to the elements.

For the isocyanate component, one utilizes for example an essentially trifunctional polyisocyanurate from 1,6 hexamethylenediisocyanate having an NCO radical content of about 20 to 23% by weight. In one variation, one can utilize an essentially trifunctional biuret from 1,6-hexamethylenediisocyanate having an NCO radical content of about 21 to 25% by weight.

For the polyalcohol component, in an advantageous embodiment of the invention, a slightly ramified polyester polyalcohol with a base of trimethylol propane, 1,6-hexanidol, adipic acid and o- and i- phtalic acid, having an OH radical content of 3 to 5% by weight, is utilized.

In another advantageous embodiment, a trimethylolpropane or glycerol and caprolactone-based trifunctional lactonepolyester polyalcohol having a corresponding OH radical content of about 8 to 12% by weight, is used as a polyalcohol component.

The choice of a polyesterpolyalcohol is completely surprising, because it is well known to those of skill in the art that the polyester alcohols generally do not withstand hydrolysis well. The invention runs against prior knowledge.

Contrary to reactive mixtures forming known polyurethane coating layers, in which an NCO/OH ratio of 0.8 emerged as particularly advantageous, in an advantageous embodiment of the invention, a reactive mixture is used, having a ratio of NCO/OH equivalents of 0.9 to 1.1, and preferably around 1, i.e., the stoichiometric ratio. The most favorable properties are thus achieved in the aging test.

The reactive mixture utilized to produce the coating layer according to the invention can contain additives such as extending agents, organic solvents, light protective agents, anti-UV agents. These additives are generally added to the polyalcohol component. As an extending agent, the silicone resin oils (oxyalkylenepolysiloxanes), fluoralkyl esters can be mentioned. As light protective agents, the steric inhibiting amines, in quantities between 0.5 and 5% by weight with respect to the weight of the polyalcohol, can be mentioned. As anti- UV agents, the substituted benzotriazoles, in quantities between 0.5 and 5% by weight, with respect to the weight of the polyalcohol, can be mentioned.

The layer according to the invention is generally formed by pouring the reactive mixture as described, for example, in European patent publication Nos. 0 132 198 and 0 133 090.

It can also be formed by spraying the reactive mixture or by reactive injection into a mold. The layer can be formed in situ on the panel to be covered. It can be made on a formation support, from which it is subsequently removed, after its possible combination with one or several other layers of plastic materials. The sheet obtained is next attached to the substratum to form the desired pane.

"Layer" according to the invention, is defined as the layer on on a substratum, as well as in the form of an independent sheet, having one or several layers.

DETAILED DESCRIPTION OF THE INVENTION

Various examples for the preparation of the coating layers according to the invention are described below.

EXAMPLE 1

460 parts by weight of 1,6-hexanediol and 70 parts of trimethylolpropane are esterified with 167 parts of adipic acid, 56 parts of o-phtalic acid and 247 parts of i-phtalic acid, until a free OH radical content of about 4.3% by weight is reached and the acid index (DIN 53.402) is about 1. The slightly ramified polyester-polyalcohol thus obtained constitutes the polyalcohol component for the reactive mixture. To the polyester-polyalcohol, one adds 0.1% by weight of a fluoroalkyl ester as an extending agent and 1% by weight of bis-sebacate (1,2,2,6,6-pentamethyl-4-piperidyle) as a light-protective agent.

For the preparation of the reactive mixture, 100 g of an essentially trifunctional polyisocyanate, namely a biuret of 1,6-hexamethylenediisocyanate, having a free NCO radical content of 23% by weight, is heated with 216 g of the above described polyester polyalcohol, to a temperature of 80° C.; they are agitated at this temperature for 10 minutes. The NCO/OH equivalent ratio of the reaction mixture is thus 1.

After these two components are mixed, the reactive mixture is spread with a scraper, forming a layer, which is 0.5 mm thick, on flat sheets which have been preheated to 70° C. For the hardening of the layer, the coated glass sheets are kept at a temperature of 90° C. for 30 minutes, for example, in a thermostatically controlled forced air oven.

After the coating layers thus prepared are hardened and conditioned at 20° C. under a relative humidity of 50%, the polyurethane layers are detached from the glass supports so that their mechanical properties can be determined; the sheets are measured for their traction resistance and extension under traction according to DIN standard 53455, as well as the E module conforming to DIN standard 53457. Resistance to the spread of cracks is also determined according to Graves, in compliance with DIN standard 53515. In addition, abrasion resistance is determined according to ECE standard R-43 and resistance to scratching according to Erichsen is measured on polyurethane layers attached to glass supports. In the determination of scratch resistance according to Erichsen, an experimental assembly as described in DIN standard 53799 is utilized, with the exception that the conical scratching diamond utilized has a conical angle of 50 degrees and a curve radius of 15 μm at the vertex of the cone. To evaluate scratch resistance, the highest applied load of the scratching diamond for which no visible, permanent damage to the surface can be identified, is relied on.

The evaluation of the state of the surface of the polyurethane layers is effected visually.

The results of the mechanical measurements are summarized in table 1 below. The table also indicates, for the various mechanical properties, the ranges in which the measured values must be located so that the polyurethane coating meets the criteria concerning usage comportment and, specifically, concerning the self-repairing properties.

COMPARATIVE EXAMPLE

The same procedure as in example 1 is followed, but taking 81.3 g of a polyetherpolyalcohol having a molecular weight of about 450, obtained by the condensation of 1,2 propylene oxide with 2,2 bis (hydroxymethyl)-1-butanol having a free OH radical content of about 11.5 as a polyalcohol, and adding to the polyalcohol, 0.05% by weight with respect to the weight of the polyalcohol, dibutyltin dilaurate, as a catalyst, 0.1% by weight of a fluoroalkyl ester, as an extending agent, 1% by weight of 1,2,2,6,6-pentamethyl-4-piperidyle, as a light-protective agent.

TABLE 1

|  | Traction Resistance N/mm² | Extentsion under traction % | Resistance to crack spreading N/mm | E Module N/mm² | Abrasion Cloudness % | Scratch Resistance P |
|---|---|---|---|---|---|---|
| Limit values of the required range | 5-40 | 60 | 5-20 | 2-20 | 4 | 10 |
| Example 1 | 9.87 | 131.1 | 11.8 | 6.46 | 2.71 | 24 |
| Comparative example | 10.4 | 115 | 6.5 | 13.0 | 3.5 | 12 |

Table 1 shows that all of the mechanical properties of the layer according to the example are within the required limits.

To examine the influence of the open atmosphere on the condition of the surface, a certain number of test pieces are exposed openly to the elements, in this case, for a duration of several months. At the end of this period, no alteration of the surface of the polyurethane layer could be seen. Luster measurements indicate a very low rate of loss, under 1%, of luster.

This loss of luster is more than 50% in the case of the control sample, despite the utilization of a light-protective agent.

EXAMPLE 2

For the preparation of the reactive mixture, 100 g of an essentially trifunctional polyisocyanate containing 1,6 hexamethylenediisocyanate-based isocyanurate radicals, having a free NCO radical content of 21.5% by weight, is mixed vigorously, for 10 minutes at 40° C., with 94.2 g of a trifunctional polycaprolactone having a free OH radical content of 9.3% by weight. The NCO-/OH ratio is thus 1. Additives previously incorporated into the the polycaprolactone are 0.015% by weight with respect to the weight of the polycaprolactone, dibutyletain dilaurate as a reaction catalyst, 0.1% by weight of a fluoroalkyl ester as an extending agent and 1% by weight of bis sebacate (1,2,2,6,6-pentamethyl-4 piperidyle) as a light-protective agent. After mixing these two components, the reactive mixture is applied, with a scraper, forming a coating which is 0.5 mm thick, on glass sheets which have been preheated to 70° C. The layer is again hardened at 90° C. for a period of 30 minutes in a thermostatically controlled forced air oven.

To examine the effects of aging under different surrounding conditions, glass plates coated with this polyurethane layer are kept under these different conditions, and the mechanical and optical properties are subsequently determined. Table 2 below is a summary of the results of the mechanical property measurements, with the various test pieces having been exposed to the following operations:

Test piece A: Measurement immediately after the hardening of the polyurethane layer.

Test piece B: Kept for 21 days in the laboratory under normal surrounding conditions.

Test piece C: Kept for 2 hours at 60° C. in a forced air oven.

Test piece D: Kept for 7 days at 50° C. under relative atmospheric humidity of 100%.

TABLE 2

|  | Traction Resistance N/mm² | Extension under traction % | Resistance to crack spreading N/mm | E Module N/mm² | Abrasion Cloudness % | Scratch Resistance P |
|---|---|---|---|---|---|---|
| Limit values of the required range | 5–40 | 60 | 5–20 | 2–20 | 4 | 10 |
| Test piece A | 24.0 | 119.9 | 9.5 | 8.8 | 2.3 | 34 |
| Test piece B | 22.4 | 100.8 | 11.7 | 11.8 | 2.1 | 46 |
| Test piece C | 24.0 | 121.5 | 13.1 | 9.7 | 2.5 | 41 |
| Test piece D | 29.5 | 114 | 13.8 | 13.1 | 2.15 | 35 |

The measurement results again show that even after the most varied artificial aging treatments, the physical-mechanical properties fall within the required limits, i.e., no significant alteration in these properties could be seen. Another series of test pieces was exposed directly to the elements for several months, by exposing glass panes endowed with the coating layers, to the direct action of the outside atmosphere. After exposure, a visual examination of the coating layer was conducted as well as luster measurements according to DIN standard 67530. The visual evaluation indicated that there was no visible alteration of the surface or in the depth of the coating layer. The luster measurements indicate an extremely small degree of decrease in superficial luster, of about 0.5% compared with the values measured on the same samples before exposure to the elements.

The coating layer according to the invention can be utilized in all of the aforementioned applications. It is also utilized in combination with a polyurethane coating having energy absorbant properties to form a two-layer sheet, as described, for example, in European patent publication Nos. 0 132 198 and 0 133 090, with this two-layer sheet being advantageously utilized in compound safety panes.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A transparent polyurethane coating layer with self-repairing properties for panes or transparent objects made of glass or plastic material, formed from a reactive mixture comprising a plurifunctional isocyanate component and a plurifunctional polyalcohol component, wherein the isocyanate component of the reactive mixture is chosen from the essentially trifunctional aliphatic polymers formed from 1,6-hexamethylenediisocyanate monomer, having an NCO radical content of 15 to 25% by weight and the polyalcohol component of the reactive mixture is a plurifunctional polyester polyalcohol having an OH radical content of 3 to 12% by weight.

2. Polyurethane coating layer according to claim 1, wherein the polyalcohol component utilized is a slightly ramified polyester polyalcohol, with a base of trimethylopropane, 1,6-hexanediol, adipic acid, o-phtalic acid and i-phtalic acid, having an OH radical content of 3 to 5% by weight.

3. Polyurethane coating layer according to claim 1, wherein the polyalcohol component is a trifunctional polycaprolactone having an OH radical content of 8 to 12% by weight.

4. Polyurethane coating layer according to claim 1, wherein a reactive mixture having an NCO/OH ratio of 0.9 to 1.1 and preferably of about 1 is utilized.

5. Polyurethane coating layer according to claim 1, wherein the reactive mixture contains at least one of the following additives:
dibutyltin dilaurate as a reaction catalyst, an extending agent selected from the group consisting of silicone oils, silicone resins, fluoroalkyl esters and mixtures thereof in a quantity of 0.05% to 0.15% by weight, 0.5 to 2% by weight of bis-sebacate (1,2,2,6,6-pentamethyl-4-piperidyle) as a light-protective agent and substituted benzotriazoles as ultraviolet absorbing agents in a quantity of 0.5 to 5% by weight.

6. Pane comprising a coating layer according to claim 1.

7. Sheet of plastic material characterized in that it comprises a polyurethane layer according to claim 1.

8. Sheet according to claim 7, characterized in that the polyurethane layer is combined with a polyurethane layer having energy absorbing properties.

* * * * *